(12) United States Patent
Tamir et al.

(10) Patent No.: US 9,390,459 B2
(45) Date of Patent: Jul. 12, 2016

(54) METHOD AND SYSTEM FOR USER BASED ROUTING

(71) Applicant: Sears Brands, L.L.C., Hoffman Estates, IL (US)

(72) Inventors: Michael Tamir, San Jose, CA (US); Robin Glinton, San Jose, CA (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/971,431

(22) Filed: Aug. 20, 2013

(65) Prior Publication Data

US 2015/0058157 A1 Feb. 26, 2015

(51) Int. Cl.
*G06Q 90/00* (2006.01)
*G06Q 30/06* (2012.01)
*G06Q 50/00* (2012.01)

(52) U.S. Cl.
CPC ............ *G06Q 90/20* (2013.01); *G06Q 30/0631* (2013.01); *G06Q 50/01* (2013.01)

(58) Field of Classification Search
USPC ............ 379/127.06; 701/400, 408–410
See application file for complete search history.

(56) References Cited

U.S. PATENT DOCUMENTS

| | | | |
|---|---|---|---|
| 8,155,872 B2* | 4/2012 | Kjeldsen | G01C 21/206 340/8.1 |
| 8,706,401 B2* | 4/2014 | Lee | G01C 21/3423 340/995.14 |
| 2014/0095063 A1* | 4/2014 | Saraswat | G06Q 30/0224 701/410 |

OTHER PUBLICATIONS 7.1.1 Partitioning Around Medoids (PAM). Found at <http://www.unesco.org/webworld/idams/advguide/Chapt7_1_1.htm> on Aug. 19, 2013. (4 pages).

* cited by examiner

*Primary Examiner* — Amal Zenati
(74) *Attorney, Agent, or Firm* — McAndrews, Held & Malloy, Ltd.

(57) ABSTRACT

A system and method for providing route information to a user, in which paths provided to the user are automatically selected based on personal information of the user, so that in following the provided paths, the user passes things in which the user may have particular interest.

33 Claims, 5 Drawing Sheets

METHOD AND SYSTEM FOR USER BASED ROUTING

FIELD OF THE INVENTION

Certain embodiments of the present invention relate to systems and methods for providing directions to a consumer searching for a desired product in a retail environment. More specifically, certain aspects of the present invention relate to systems and methods for providing route information to a user, in which paths provided to the user are determined based on personal information of the user, so that in following the provided paths, the user passes particular things in which the user may have interest.

BACKGROUND OF THE INVENTION

In order to provide information to aid consumers in locating a particular product in a retail environment, a merchant may provide signage that displays a static list of products or product categories and their locations by floor and/or aisle, or a diagram showing the location of various departments in the store. Some merchants may provide printed maps of the store layout at store entrances, or may provide a listing of the most frequently sought products or product categories along with location information identifying the location on the map where the product is available. Other merchants may provide an electronic device on a shopping cart of the consumer, through which the consumer may access the store location of desired products. Some merchants may provide a loaner device, or may permit the consumer to install a merchant sponsored software application for use on their own handheld device such as a smart phone, media player, electronic organizer, or handheld computer, to access directions to the products within retail locations of the merchant.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for providing a route to a user traveling from a first location to a second location according to personal information of the user, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to systems and methods for providing directions to a consumer searching for a desired product in a retail environment. More specifically, certain aspects of the present invention relate to systems and methods for providing route information to a user, in which paths provided to the user are determined based on personal information of the user, so that in following the provided paths, the user passes particular things in which the user may have interest.

The following description of example methods and apparatus is not intended to limit the scope of the description to the precise form or forms detailed herein. Instead the following description is intended to be illustrative so that others may follow its teachings.

The present application makes reference to U.S. patent application Ser. No. 13/494,758, entitled "Systems and Methods for High-Precision In-Store Positioning, Navigation and Shopping Behavior Profiling," filed Jun. 12, 2012, the complete subject matter of which is hereby incorporated herein by reference, in its entirety.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The terms "customer," "consumer," and "user" may be used herein interchangeably to refer to a potential or existing purchaser of products and/or services of a business.

The term "social network" may be used herein to refer to a network of family, friends, colleagues, and other personal contacts, or to an online community of such individuals who use a website or other technologies to communicate with each other, share information, resources, etc.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. In one example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

Figure 1:
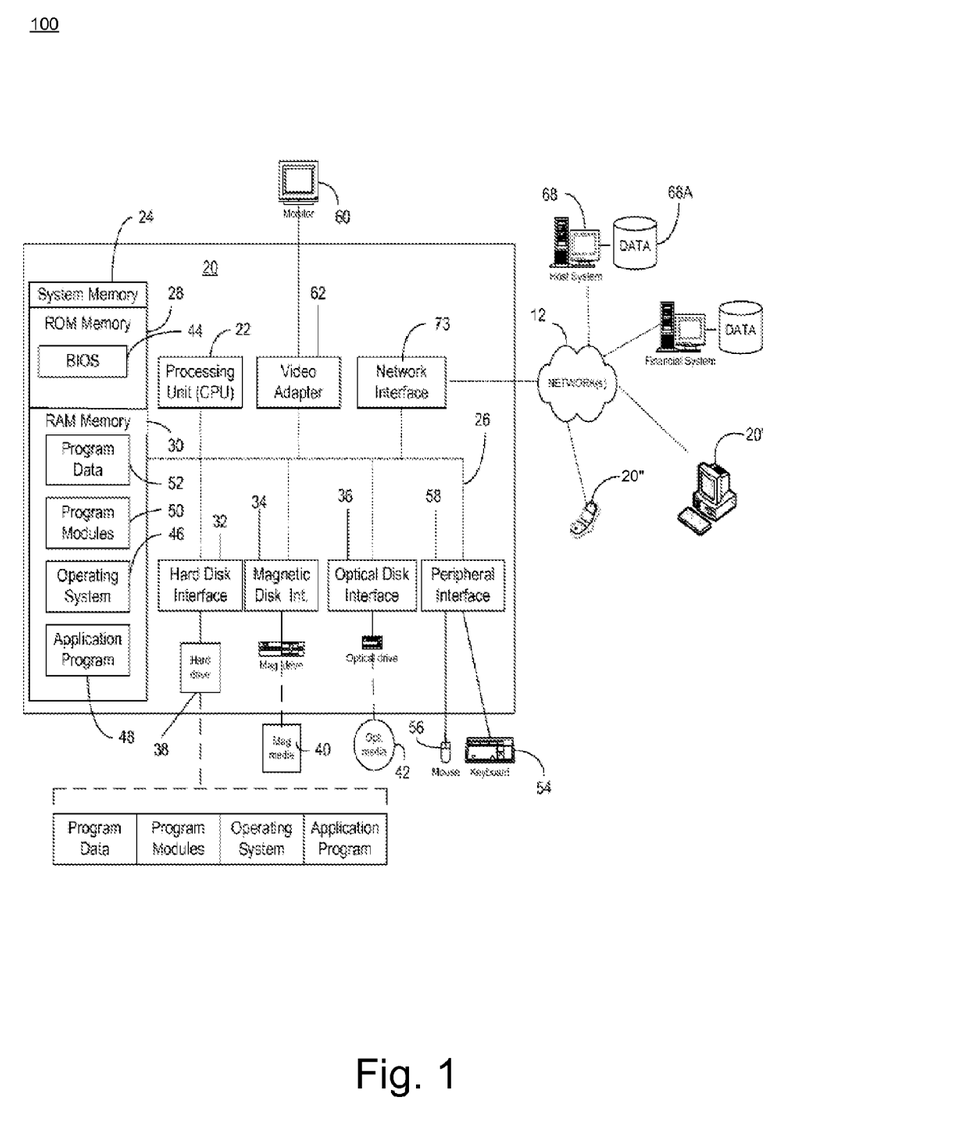
FIG. 1 is an illustration of computer network, in which a representative embodiment of the present invention may be practiced.

FIG. 1 is an illustration of exemplary computer network in which a representative embodiment of the present invention may be practiced. The following discloses various example systems and methods for, by way of example and not limitation, producing and delivering direction information to customers via a computer network, to a handheld or mobile device such as those described above, and to devices such as kiosks and public terminals located both indoors and outdoors at business and other locations. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents, social network storage of a shopping list, receiving a location of a customer via a mobile device, maintaining maps and layouts of buildings and geographic areas, calculating directions or routes within buildings and geographic areas, receiving a request for a service call center connection from either a customer or a sales associate, routing the request via a distributed mobile video call center, and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present invention may be seen in a system or method for providing route information or paths of travel to a user, in which the paths provided to the user are automatically selected based on personal information of the user, so that in following the provided paths, the user passes particular things in which the user may have particular interest, as further described below.

Figure 2:
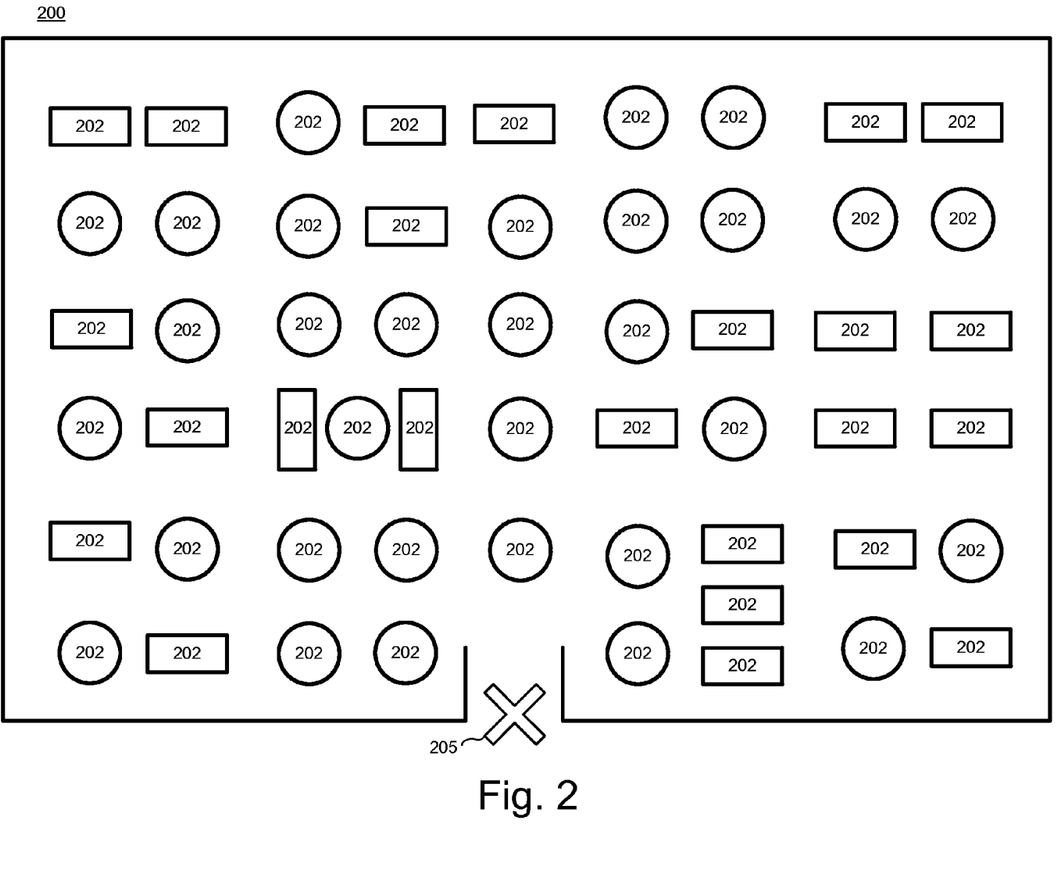
FIG. 2 shows an overhead view of the layout of an exemplary sales floor of a business, to which a representative embodiment of the present invention may be applied.

FIG. 2 shows an overhead view of the layout of an exemplary sales floor 200 of a business, to which an embodiment of the present invention may be applied. On the sales floor 200 of FIG. 2 are shown a number of islands 202 shown as circles and rectangles representing various display racks and shelving units that may be used to hold products for sale. The shapes and number of the symbols used to represent such display racks and shelving units may be different from that shown in FIG. 2 without departing from the spirit and scope of the present invention. The islands 202 are separated by sufficient space to permit passage of customers with or without shopping carts, strollers, etc. The sales floor 200 may be divided into areas or portions (not shown) in which products belonging to corresponding categories may be arranged. Certain areas of the sales floor may include stairways, escalators, and/or elevators (not shown) that may link the sales floor 200 with other sales floors and/or other floors of the business, and may, along with other building structures (e.g., storage rooms, dressing rooms, bathrooms, and checkout counters, not shown), act as obstacles to movement of customers and employees of the business about the sales floor 200. The illustration of FIG. 2 also includes a location X 205 which may represent, for example, the location of a customer entry/exit door of the business. In a representative embodiment of the present invention, the layout of each of the sales floors of the business, including the physical locations and dimension of the various islands, storage rooms, dressing rooms, bathrooms, and checkout counters, and the presence and connectivity of various sales floors via stairways, escalators, and elevators may be maintained by, for example, the host system 68 of the computer network 100 of FIG. 1, and may be used in calculating route information for customers wishing to locate particular products and product categories on the sales floor(s), and by other systems of the business. Such information may be referred to herein as map information.

It should be noted that the illustration of FIG. 2 is meant as an example to aid understanding, and does not necessarily represent any specific limitations of the present invention, unless recited by the claims. The operator of the business having sales floor 200 may maintain business information identifying the physical locations of each of the display racks and shelving units on each sales floor of the business, in association with information identifying the products that are displayed for sale or order on each of shelves or portions of the display racks and shelving units. Such product identification information may comprise, by way of example and not limitation, stock keeping units (SKUs), manufacturer and/or model identifiers, item identifiers, Universal Product Codes (UPCs), and/or any other suitable form of product identification.

In a representative embodiment of the present invention, systems within the business may determine the identity of a customer upon arrival at the location X 205, and/or at other locations, at any time after arrival at the business, or within a certain proximity of the business. Such customer identification may be performed without customer involvement using, for example, electronic devices and systems on or near the sales floor 200. Such systems may receive wireless signals automatically communicated by electronic devices carried by the customer, or may receive signals the transmission of which may be manually initiated by the customer using software, logic, and/or circuitry of the electronic device of the customer. In some representative embodiments of the present invention, the customer may use a software application (i.e., "app") placed on the electronic device by the customer, a business, or other entity. One example of a location system may be found in U.S. patent application Ser. No. 13/364,441, entitled "METHODS AND SYSTEMS FOR PROVIDING LOCATION BASED ASSISTANCE VIA A MOBILE DEVICE," filed on Feb. 2, 2012, the complete subject matter of which is hereby incorporated herein by reference, in its entirety. In various representative embodiments of the present invention, the operator of the business of sales floor 200 may maintain or have access to information that associates customers of the business with characteristics of the electronic devices of the customers, to enable the business operator to recognize the presence of and identify customers within a certain proximity of the business, in the manner described above. In addition, the operator of the business of sales floor may maintain personal information about customers of the business including, for example, a history of prior purchases by the customer.

Although some of the individuals visiting a business having products for sale may simply be "just looking," in the majority of cases, a customer that visits a business, such as a business having a sales floor like the sales floor 200 of FIG. 2, does so because they wish to locate a particular product or product category. It is quite typical for businesses to provide static displays identifying the location of various product categories or store departments to customers attempting to locate a product. Some businesses provide electronic means of determining the whereabouts of a product. A representative embodiment of the present invention permits the operator of a business to respond to a customer's request for route information or directions to a product, product category, or department through various electronic devices, while customizing the path through the sale floor to the desired product according to personal information of the customer, but does not significantly modify the path length. In this way, a representative embodiment of the present invention may find particular paths that guide the customer to the desired product while increasing the likelihood of additional purchases of products of interest to the customer.

Figure 3:
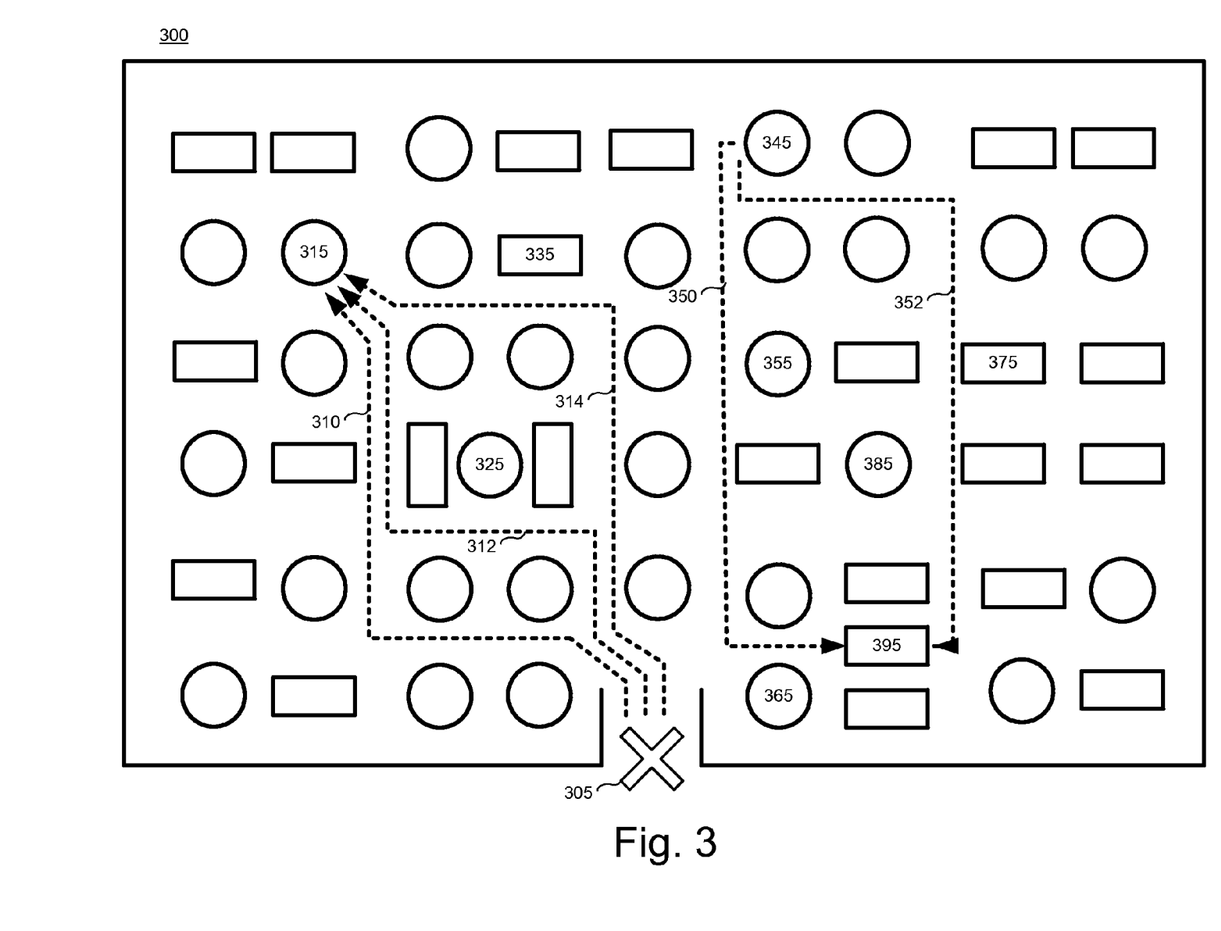
FIG. 3 illustrates an overhead view of the layout of an exemplary sales floor of a business that may, for example, correspond to the sales floor of FIG. 2, showing multiple paths from a first customer location to a first desired product location and multiple paths from a second customer location to a second desired product location, in accordance with a representative embodiment of the present invention.

FIG. 3 illustrates an overhead view of the layout of an exemplary sales floor 300 of a business that may, for example, correspond to the sales floor 200 of FIG. 2, showing multiple paths 310, 312 from a first customer location 305 to a first desired product location 315 and multiple paths 350, 352 from a second customer location 345 to a second desired product location 395, in accordance with a representative embodiment of the present invention.

In a first example, the illustration of FIG. 3 shows a starting location X 305 of a customer at an entrance of the business sales floor 300. At location X 305, the customer may access an electronic directory using a kiosk, or using an electronic device of the user such as, by way of example and not limitation, a smart phone, a tablet computer, or a media player, which may correspond to one of the processing devices 20, 20' 20" of FIG. 1, for example. The identity of the customer may be automatically determined by the systems in the business when the customer is within a certain proximity of the business, as described above, and the customer may be greeted via the processing device 20, 20', 20" they are using. The customer may be at the business because of their interest in a particular product, and may identify the product of interest by providing information identifying the specific product, or identify the product of interest by searching a product catalog maintained by the systems of the business, using one of the processing device(s) 20, 20', 20".

Once the customer has identified the product to one of the processing devices 20, 20', 20" of FIG. 1, the customer may request route information to guide the customer to the location within the business at which the product may be found. In response to the request for help, a representative embodiment of the present invention may determine the physical location of the customer, the physical location of the product of interest to the customer, and in addition, may access personal information about the customer from various sources, including information maintained by or accessible to the business.

In a representative embodiment of the present invention, such personal or customer-specific information may include, by way of example and not limitation, historical information identifying products purchased by the customer, historical information about past search queries, and information identifying those products, brands, and categories that, for example, the customer likes, wants (e.g., a "wish list"), has/owns, or wants to "follow" (i.e., keep abreast of). The customer may provide such product preference or interest information by, as an example and not limitation, selecting an icon or link on a product page, an email, or a text message, or via their response(s) to advertisements, polls, or other communication delivered to the customer via paper, electronic, or any other suitable means that permits the capture of customer responses/reactions to questions.

The personal information for customers may also include demographic information such as, for example, the customer's birth date, gender, height, weight, clothing size(s), brand or designer preferences, information identifying the customer's email address(es) and the social network(s) to which they belong, and the identities and similar personal information for their friends, members of their family, and members of their social network(s). Some of the above-mentioned personal information may be gathered from the customer directly such as, for example, when filling out a questionnaire, when applying for membership in a loyalty program of the sponsor or operator, or a business partner of the sponsor or operator of a system in accordance with a representative embodiment of the present invention. Personal information for customers, whether or not they are known to the business to be, for example, account holders of credit cards of the business or members of a loyalty program, may be gathered through analysis of video images captured by the systems of the business. This may be done, by way of example and not limitation, using image capture devices in product displays, indoor and outdoor kiosks, security cameras, and electronic devices of the customer such as, for example, their personal smart phone, a tablet computer, or media player that is suitably equipped, for example.

A representative embodiment of the present invention, having the physical location of the product or product category of interest, the physical location of the customer, and personal information of the customer, may calculate two or more routes from the customer location to the location of the product or product category of interest, using information about the locations of the various display shelves of the sales floor 300, and the personal information of the customer.

In a first example, a customer at location X 305 may identify a product or product category of interest, which may be located at island 315. A representative embodiment of the present invention may calculate a number of different routes or paths from the customer location X 305 to the location of product of interest at island 315, using a known algorithm for calculating shortest paths between two points. From all of the paths that may be calculated between location X 305 to island 315, three such paths 310, 312, 314, are illustrated in FIG. 3, and the lengths of the three paths 310, 312, 314 from the location X 305 to the island 315 displaying the product of interest may be calculated to be within a certain difference in length from one another or within a certain difference in length from the shortest path length.

A representative embodiment of the present invention may then use personal information of the customer such as, by way of example and not limitation, any of the items of personal information described above, to assign to each of the paths 310, 312, 314 a score representative of, for example, the relevance, interest, and/or likelihood of purchase of products that are displayed within view of a customer traveling along the path. For example, a representative embodiment of the present invention may determine, using purchase history information of the customer, that the customer at location X 305 is a purchaser of shaving cream, that he/she normally purchases shaving cream every six weeks, that he/she last bought shaving cream five weeks ago and may need shaving cream, and that a display of shaving cream is located at island 325. By comparing information identifying products located at physical locations adjacent to, and presumably visible from, each of the paths 310, 312, 314, a representative embodiment of the present invention may determine that shaving cream is likely to be seen by the customer traveling path 312, and may display to the customer in response to the request for directions from location X 305 to location 315, the path 312 that passes island 325 rather than the path 310, thereby increasing the likelihood of an additional sale of shaving cream to the customer, thereby increasing the total revenue for the customer visit.

Some representative embodiments of the present invention may determine that multiple paths to the item of customer interest pass additional products of interest to the customer. For example, while path 310 of FIG. 3 passes no additional products that are expected to be of interest to the customer, based upon an analysis of personal information for the customer, the two other paths 312, 314 of FIG. 3 pass respective products 325, 335 that are determined to be of potential interest to the customer. A representative embodiment of the present invention may notify the customer of only the path having the most potential revenue or profit, or may notify the customer of both paths 325, 335 and the products that are passed while traveling those paths. While this example involves only three exemplary paths, this does not necessarily represent a specific limitation of the present invention, as a greater number of additional products of interest to the customer, and of paths passing by such products, may be discovered and presented to the customer, based on the analysis of the present invention.

It should be noted that although three paths 310, 312, 314 leading from the initial customer location X 305 and the product of interest 315 are described in the above example, the starting location of the customer need not be at the entrance of a business location (e.g., a sales floor), and may not pass only a single additional product of potential interest to the customer. Instead, the customer may, using the technology of the systems of the business and an electronic device of the customer in accordance with the present invention, request directions/routing information to the location of any product at any location in the business from any location in the business. Further, the calculations of a representative embodiment of the present invention may find any number of approximately equal length paths to a desired product, and may find any number of additional products of potential interest to the customer along the calculated paths.

To illustrate, in a second example, FIG. 3 also shows two paths 350, 352 between a customer location at an island 345 and the location at the island 395 of a product that may be of specific interest to the customer. Along one of the paths 350, a representative embodiment of the present invention has found two islands 355, 365 that display products of potential interest to the customer, while along the other of the paths 352, the present invention has found two other islands 375, 385 that display products of potential interest to the customer. In some representative embodiments of the present invention, the customer may be notified (e.g., on a handheld electronic device) of the two possible paths 350, 352 to the location of the product of interest at island 395 found by the present invention, and the location of islands 355, 365, 375, 385 displaying additional products of potential interest to the customer that are along those two paths 350, 352. In other representative embodiments of the present invention, the customer may be notified of only the one path of the two paths 350, 352 that passes the islands displaying products of potential interest to the customer, the purchase of which results in the greatest revenue and/or profit for the business.

If the business has no personal information available for the customer requesting the location of a product or product category, a representative embodiment of the present invention may select from the calculated paths to the product of customer interest that path having an assigned score representing the highest likelihood of sale of products related to or used in situations in which the product or product category of interest may be used. For example, the calculated paths between the location of a customer and the location of a piece of luggage of interest to the customer may be analyzed to determine whether any calculated path passes an area of a sales floor in which items related to travel such as, by way of example and not limitation, travel-size toiletries, one quart clear storage bags, luggage tags, luggage straps, postage stamps, cameras, and batteries, are displayed.

It should be noted that the analysis of a representative embodiment of the present invention is not limited to selecting paths or notifying the customer based on additional products that may be of direct, immediate, or personal use by the customer. That is, as described above, the personal information of the customer may include historical information identifying products previously purchased by the customer, historical information about past search queries, and information identifying those products, brands, and categories that, for example, the customer likes, wants, has/owns, or wants to "follow" (i.e., keep abreast of). It should be noted that, in addition, the personal information of a customer may include, by way of example and not limitation, demographic information such as the customer's birth date, gender, height, weight, clothing size(s), brand or designer preferences, information identifying the customer's email address(es) and the social network(s) to which they belong. Such personal information may also include the identities of the friends, family members, and members of their social network(s), and personal information like that for themselves, for each of those individuals. Therefore, the calculation and selection of paths, and the notification of the customer of additional products that may be of interest to the customer, may be based upon information about the friends, family members, and members of the social network(s) of the customer. Such information may be gathered from the customer directly, or may be gathered from information posted or submitted by friends, family members, and the members of social network(s) of the customer, based on permissions given by the customer and/or their friends, family members, and members of their social network(s) to the systems of the business.

In a further illustrative example, personal information for a customer may indicate that a particular individual is a friend, family member, or member of a social network of the customer, and that the personal information of that particular individual indicates that the individual has an upcoming birthday. A representative embodiment of the present invention may use personal information for that particular individual in the selection of a path for, or presentation of a notification to, the customer. In this way, the customer may be routed on a path that passes items of interest to the friends, the members of the family, and member's of the social network(s) of the customer, or may be notified of items near the customer's present location in the business (e.g., a sales floor such as that of FIG. 3), so that they may be made aware of the opportunity to purchase items as gifts for their friends, their family members, and members of the social network(s) of the customer.

In addition, the movement of the customer across the sales floor 300 may be tracked on an ongoing basis, and the personal information of the customer may be used to identify products in the vicinity of the customer that may be of interest to the customer. Messages or alerts on an electronic device such as, for example, a smart phone, a media player, a tablet computer, or any other suitable electronic device carried by the customer may be used to bring the identified products to the attention of the customer, including products of particular value by way of discount or special features, which may be displayed for the products located near to the present location or path of the customer.

Figure 4:
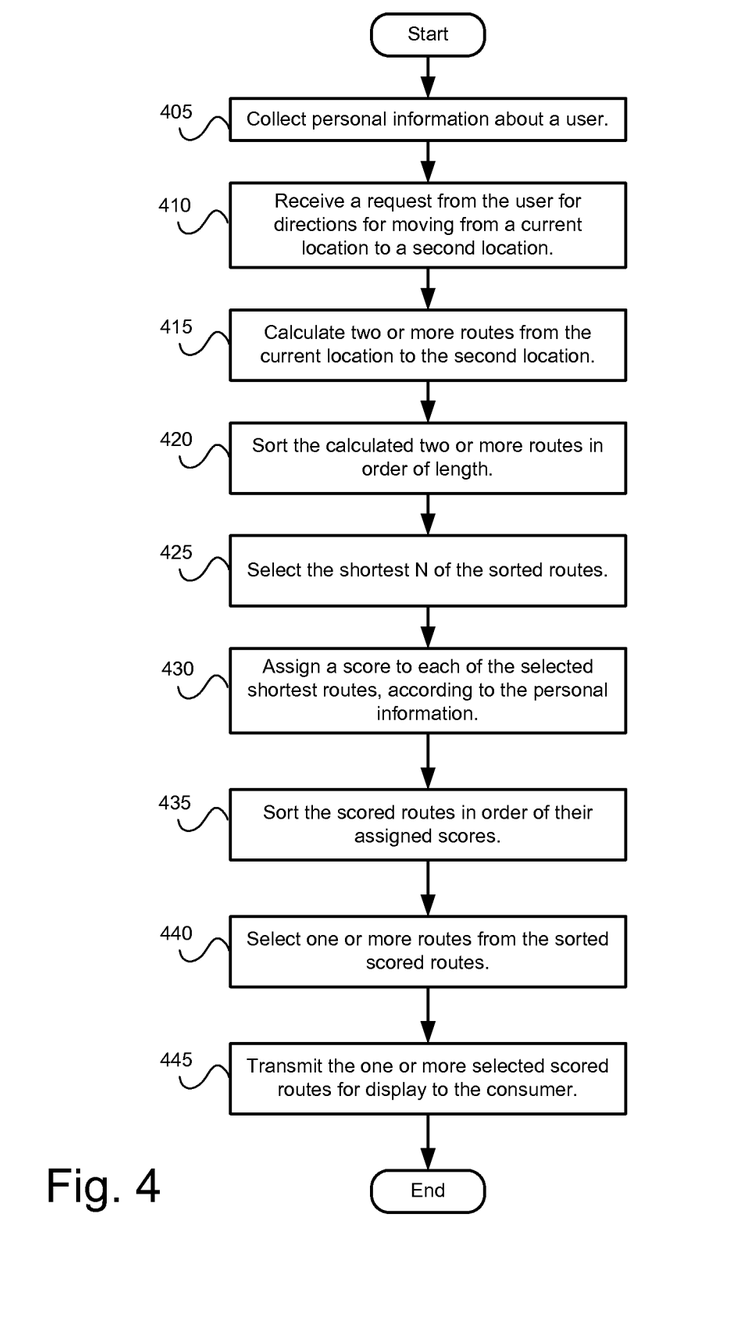
FIG. 4 is a flowchart illustrating a method of providing route information to a customer, in which two or more paths are automatically selected based on personal information of the customer, so that in following the provided paths, the customer passes particular things in which the customer may have interest, in accordance with a representative embodiment of the present invention.

FIG. 4 is a flowchart 400 illustrating a method of providing directions to a customer, in which two or more paths are automatically selected based on personal information of the customer, so that in following the provided paths, the customer passes particular things in which the customer may have interest, in accordance with a representative embodiment of the present invention. The following discussion of the method of FIG. 4 may make reference to the elements of FIGS. 1-3.

The method of FIG. 4 begins at block 405, in which a system such as, for example, the host system 68 of FIG. 1 may receive or collect personal information about a user such as a customer of a business. As described above, such personal information may be received or collected from the user explicitly using, for example, questionnaires, polls, or other suitable means, or may be received or collected from behavior of the user such as historical information identifying purchases by the user, shopping behavior as may be indicated by time spent in particular areas of a business, demographics determined based upon information regarding their residence, and/or demographics based upon video images that may be captured while in the business or from social networking websites. It should be noted that although the receiving or collection of personal information about the user is shown in FIG. 4 as a single step at the beginning of the method (for reasons of simplicity), the gathering of personal information of the user may be an ongoing process that begins when the system first becomes aware of the user, and may continue from that point on, until the operator of the system chooses to stop receiving or collection of information on the user.

Next, at block 410, the system performing the method of FIG. 4 may receive a request from the user for route information or directions for moving from a current location to a second location. The first location may be the current location of the user, and the second location may be the location within a business at which a product of interest to the user is located. In some representative embodiments of the present invention, the first and second locations may be in an indoor environment such as, for example, a business establishment. The request may be received from the user, by way of example and not limitation, via a kiosk, a personal computer, and/or a personal electronic device such as a smart phone, a tablet computer, a media player, or any other suitable device, illustrated in FIG. 1 as processing devices 20, 20', 20" of a computer network such as the computer network 100 of FIG. 1.

The method of FIG. 4 may then, at block 415, calculate two or more routes from the current location of the user to the desired second location, which in this example may be the location of a product of interest to the user. The calculation may employ information identifying details and characteristics of the physical arrangement of things in the space between the first and second locations, such as that described above with respect to FIG. 3 and the sales floor(s) and building of a business. Such information may be in the form of floor or building layout or map information maintained by a system such as, for example, the host system 68 or any other suitable element(s) of the computer network 100 of FIG. 1 that may be operated by or for the business. The calculation of the routes between locations in the business may be performed using any of a number of routing algorithms known in the art, using the floor layout or map information. A representative embodiment of the present invention may, by way of example and not limitation, employ hybrid collaborative filters using "partitioning around medoids" (PAM) clustering to rapidly score user preferences and route the user according to those preferences. Such a representative embodiment of the present invention may perform such combined scoring and routing in the time normally expected by a user of a mapping device.

Next, at block 420, the method of FIG. 4 may cause the system to sort the calculated routes in order of length. The sorting may be in descending or ascending order of length, and may be performed using any of a number of known sorting algorithms. Following completion of the sorting at block 425, the system performing the method of FIG. 4 may then select a number N of the shortest of the sorted routes.

Next, at block 430, the system performing the method of FIG. 4 may assign a score to each of the selected shortest routes, according to the personal information of the user. The calculation of the score for each of the selected shortest routes may determined using, for example, the personal information of the user and/or information about the product of interest to the user, and information identifying products or product categories that would be passed by an individual traveling along each of the selected shortest routes, which may be of interest to the user and therefore represent potential additional purchases by the user. The calculation of the score for each route may take into account, by way of example and not limitation, the prices, profit margins, likelihood of purchase based on the product of interest, and the popularity and/or sales rank of each product along the route, and the personal information of the user.

For instance, by way of example and not limitation, a representative embodiment of the present invention may use personal information about a user and/or information about the product of interest to the user, and may generate a list identifying a certain number of products that would be passed by the user while traveling along the selected shortest routes on their way to the location of the product of interest. Each product in the generated list of products may then be assigned a rank based on the degree of relevancy to, likelihood of user interest in, or other suitable measure of match of the product from the list with the personal information of the user and/or the product of interest to the user. Each of a certain number of the most highly ranked products, e.g., the top ten products in order of their rank, may then be assigned a weight. For example, the highest ranked product may be assigned the highest weight, the next highest ranked product may be assigned the next highest weight, and so on to the lowest ranked product being assigned the lowest weight. In a representative embodiment of the present invention, the sum of the weights for the certain number of highest ranked products may, for example, add up to a value of 1. The score for a particular one of the selected shortest routes may then be calculated as the sum of the weights assigned to the products that would be passed by a user traveling along that particular one of the selected shortest routes. In some representative embodiment of the present invention, the score of a route or path may be non-linearly increased if two or more products would be passed while traveling along that route.

Once scores have been assigned to each of the selected shortest routes, the method of FIG. 4 may then, at block 435, cause the system to sort the scored shortest routes in order of their assigned scores. The sorting of the scored shortest routes may be in ascending or descending order of assigned score using any of a number of known sorting algorithms. Next, the method of FIG. 4 may, at block 440, direct the system to select, from the sorted scored shortest routes according to the score assigned to each route, one or more of the scored shortest routes having scores that represent the greatest likelihood of user purchase of additional products. Finally, at block 445, the method of FIG. 4 may cause the system to transmit the selected scored shortest routes for display to the user.

It should be noted that the above example of the use of the exemplary method of FIG. 4 in an indoor environment does not necessarily represent a specific limitation of the present invention, except as recited by the claims, and that aspects of the present invention apply as well to the routing of travel while walking outdoors, riding in a motor vehicle, or other modes of transportation.

For example, a representative embodiment of the present invention may be used by one traveling in a motor vehicle, such as an operator of or passenger in a car, where the traveler requests a route from a first location to a particular second location of interest to the traveler. A representative embodiment of the present invention may calculate a number of routes between the first and second locations, may sort them by length, and may select a particular number of the shortest length routes. Such an embodiment may then assign a score to each of the selected shortest routes according to personal information of the traveler. For example, the score assigned to each route may be, by way of example and not limitation, the number of business or recreational opportunities (e.g., shops and stores, museums, fitness centers, bowling alleys, restaurants, sports bars, etc.) that the personal information of the traveler indicates may be of interest to the traveler. Such a representative embodiment may then sort the scored routes, select from the sorted scored routes one or more routes having the greatest number of businesses or recreational activities likely to be of interest to the traveler, and transmit the one or more sorted scored routes to the traveler for them to consider. In this manner, such a representative embodiment of the present invention may allow an operator of a system as in the present invention to provide customized travel routing, not limited to indoor situations, that maximizes the likelihood of the traveler patronizing businesses and recreational activities in the geographic area served by the system, through the use of personal information, or information about the destination of travel (i.e., the desired second location).

Figure 5:
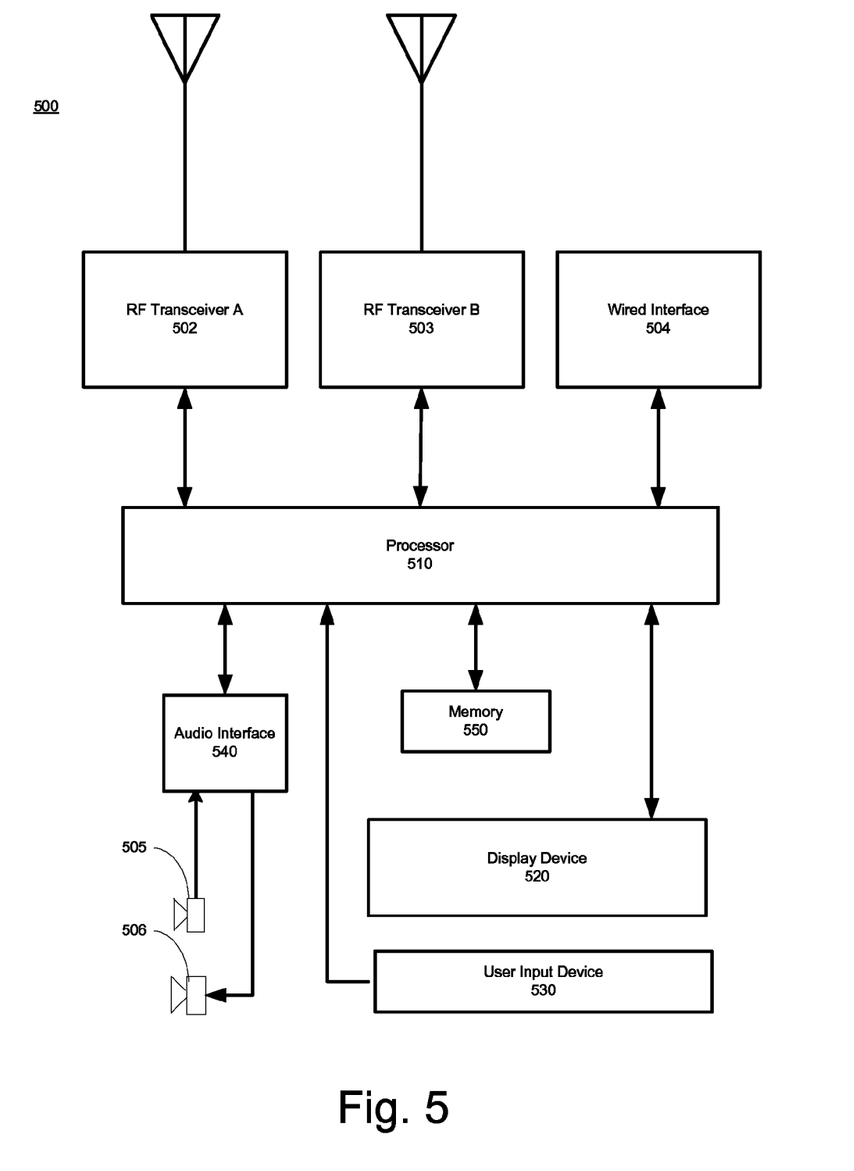
FIG. 5 is a block diagram illustrating a personal electronic device that may correspond, for example, to electronic devices shown in FIG. 1, in accordance with a representative embodiment of the present invention.

FIG. 5 is a block diagram illustrating a personal electronic device 500 that may correspond, for example, to electronic devices 20', 20', 20'' shown in FIG. 1, in accordance with a representative embodiment of the present invention. The personal electronic device 500 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 5, the personal electronic device 500 includes a processor 510, an RF transceiver A 502, an RF transceiver B 703, a wired interface 504, a display device 520, a user input device 530, an audio interface 540, and a memory 550. The processor 510 may be, for example, a suitable microprocessor or microcomputer having sufficient computing power to control the personal electronic device 500, and is operably coupled to the RF transceiver A 502, the RF transceiver B 503, and the wired interface 504. The RF transceiver A 502 and RF transceiver B 503 may comprise any necessary circuitry, logic, and software/firmware for wireless communication over any of, for example, the cellular, Bluetooth, Wi-Fi (e.g., IEEE 802.11a/b/g/n/ac), Zigbee, WiMAX, or any other wireless network known now or in the future. The wired interface 504 may comprise any necessary circuitry, logic, and software/firmware for wired communication over any of, for example, an Ethernet, Universal Serial Bus, FireWire (IEEE 1394) or other wired networks known now or in the future.

The processor 510 is also operably coupled to the memory 550, and may be used for non-transitory storage of executable program instructions, parameters, and data for any of the circuitry of the personal electronic device 500. The display device 520 is also operably coupled to the processor 510, and may comprise, for example, one or more LED, OLED, LCD, or other form of visual display capable of presenting text or graphics, and may comprise any circuitry, logic, or software/firmware to support, for example, a graphical user interface (GUI). The user input device 530 may comprise, for example, suitable switches, buttons, or touch sensitive surfaces to enable user control and operation of the personal electronic device 500, and may comprise any necessary circuitry, logic, and software/firmware to allow it to perform those functions. In a representative embodiment of the present invention, the user input device 530 may be a touch sensitive surface at the viewing side of the display device 520, enabling a user to use the touch sensitive surface of the display device to enter user inputs and respond to displayed information. The audio interface 540 comprises any necessary circuitry, logic, and software to interface a microphone 505 and a speaker 506 to the processor 510.

Aspects of the present invention may be seen in a method of operating a system for providing routing information to a user moving between a current location and a second location identified by the user. Such a method may comprise receiving personal information of the user, receiving a request from the user for directions for moving from the current location to the second location, and calculating two or more routes from the current location to the second location. A method in accordance with the present invention may also comprise assigning a score to each of the calculated routes, according to the personal information, sorting the calculated routes in order of their assigned scores, selecting one or more routes from the sorted routes, and transmitting the one or more routes for display to the consumer. In some representative embodiments of the present invention, the routes may be in an indoor environment, and the personal information of the user may comprise one or both of purchase history information and product preference information. The personal information of the user may comprise demographic information captured from a video image of the user, and may comprise information about a member of a social network of the user.

In a representative embodiment of the present invention, the score assigned to a particular route may be representative of a level of interest of the user in things along the particular route. The particular route may be a path through a store, the second location may be a location of a product identified by the user, and the things may be products for purchase. In some representative embodiments of the present invention, selecting one or more routes may comprise choosing one or more of the sorted routes having scores representative of a greatest level of interest to the user, and recording locations for display to the user with the one or more routes, the locations being of particular interest to the user according to the personal information of the user.

Additional aspects of the present invention may be found in a system for providing routing information to a user moving between a current location and a second location identified by the user. Such a system may comprising at least one processor communicatively coupled to a display device, and the at least one processor, during operation, may at least perform the method described above.

Yet other aspects of the present invention may be observed in a non-transitory computer-readable medium having a plurality of code sections, where each code section comprises a plurality of instructions executable by one or more processors to perform actions of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a system for providing routing information to a user moving between a current location and a second location of a product or a product category identified by the user, the method comprising:
   receiving personal information of the user;
   receiving a request from the user for directions for moving from the current location to the second location;
   in response to the user request, calculating two or more routes from the current location to the second location;
   selecting, from the two or more routes, a particular number of the shortest routes of the two or more routes;
   assigning a score to each of the selected routes, wherein assigning comprises:
      generating a respective list of products that would be passed by the user while traveling from the current location to the second location along each particular route of the selected routes, and
      calculating the score for each particular route of the selected routes as a sum of values assigned to each product of the respective list of products for the particular route, wherein the assigned values are representative of one or both of a likelihood of purchase of the product by the user and a degree of relevancy of the product to the product identified by the user;
   sorting the selected routes in order of their assigned scores;
   selecting one or more routes from the sorted routes; and
   transmitting the one or more routes for display to the user.

2. The method according to claim 1, wherein the routes are in an indoor environment.

3. The method according to claim 1, wherein the personal information of the user comprises purchase history information.

4. The method according to claim 1, wherein the personal information of the user comprises demographic information captured from a video image of the user.

5. The method according to claim 1, wherein the personal information of the user comprises information about a member of a social network of the user.

6. The method according to claim 1, wherein the score assigned to a particular route is representative of a level of interest of the user in things along the particular route.

7. The method according to claim 6, wherein the particular route is a path through a store, the second location is a location of a product identified by the user, and the things are products for purchase.

8. The method according to claim 1, wherein selecting one or more routes comprises:
   choosing one or more of the sorted routes having scores representative of a greatest level of interest to the user; and
   recording locations for display to the user with the one or more routes, the locations being of particular interest to the user according to the personal information of the user.

9. A system for providing routing information to a user moving between a current location and a second location of a product or a product category identified by the user, the system comprising:
   at least one processor communicatively coupled to a display device, the at least one processor, during operation, at least:
      receiving personal information of the user;
      receiving a request from the user for directions for moving from the current location to the second location;
      in response to the user request, calculating two or more routes from the current location to the second location;
      selecting, from the two or more routes, a particular number of the shortest routes of the two or more routes;
      assigning a score to each of the selected routes, wherein assigning comprises:
         generating a respective list of products that would be passed by the user while traveling from the current location to the second location along each particular route of the selected routes, and
         calculating the score for each particular route of the selected routes as a sum of values assigned to each product of the respective list of products for the particular route, wherein the assigned values are representative of one or both of a likelihood of purchase of the product by the user and a degree of relevancy of the product to the product identified by the user;
      sorting the selected routes in order of their assigned scores;
      selecting one or more routes from the sorted routes; and
      transmitting the one or more routes to the display for viewing by the consumer.

10. The system according to claim 9, wherein the routes are in an indoor environment.

11. The system according to claim 9, wherein the personal information of the user comprises purchase history information.

12. The system according to claim 9, wherein the personal information of the user comprises demographic information captured from a video image of the user.

13. The system according to claim 9, wherein the personal information of the user comprises information about a member of a social network of the user.

14. The system according to claim 9, wherein the score assigned to a particular route is representative of a level of interest of the user in things along the particular route.

15. The system according to claim 14, wherein the particular route is a path through a store, the second location is a location of a product identified by the user, and the things are products for purchase.

16. The system according to claim 9, wherein selecting one or more routes comprises:
   choosing one or more of the sorted routes having scores representative of a greatest level of interest to the user; and recording locations for display to the user with the one or more routes, the locations being of particular interest to the user according to the personal information of the user.

17. A non-transitory computer-readable medium having a plurality of code sections, each code section comprising a plurality of instructions executable by one or more processors to perform actions that provide routing information to a user moving between a current location and a second location of a product or product category identified by the user, the actions of the processor comprising:
receiving personal information of the user;
receiving a request from the user for directions for moving from the current location to the second location;
in response to the user request, calculating two or more routes from the current location to the second location;
selecting, from the two or more routes, a particular number of the shortest routes of the two or more routes;
assigning a score to each of the selected routes, wherein assigning comprises:
generating a respective list of products that would be passed by the user while traveling from the current location to the second location along each particular route of the selected routes, and
calculating the score for each particular route of the selected routes as a sum of values assigned to each product of the respective list of products for the particular route, wherein the assigned values are representative of one or both of a likelihood of purchase of the product by the user and a degree of relevancy of the product to the product identified by the user;
sorting the selected routes in order of their assigned scores;
selecting one or more routes from the sorted routes; and
transmitting the one or more routes for display to the user.

18. The non-transitory computer-readable medium according to claim 17, wherein the routes are in an indoor environment.

19. The non-transitory computer-readable medium according to claim 17, wherein the personal information of the user comprises purchase history information.

20. The non-transitory computer-readable medium according to claim 17, wherein the personal information of the user comprises demographic information captured from a video image of the user.

21. The non-transitory computer-readable medium according to claim 17, wherein the personal information of the user comprises information about a member of a social network of the user.

22. The non-transitory computer-readable medium according to claim 17, wherein the score assigned to a particular route is representative of a level of interest of the user in things along the particular route.

23. The non-transitory computer-readable medium according to claim 19, wherein the particular route is a path through a store, the second location is a location of a product identified by the user, and the things are products for purchase.

24. The non-transitory computer-readable medium according to claim 17, wherein selecting one or more routes comprises:
choosing one or more of the sorted routes having scores representative of a greatest level of interest to the user; and
recording locations for display to the user with the one or more routes, the locations being of particular interest to the user according to the personal information of the user.

25. The method according to claim 1, wherein the value assigned to each product is representative of a degree of relevancy of the product to the user based on the personal information of the user.

26. The method according to claim 1, wherein the value assigned to each product is representative of a likelihood of purchase of the product by the user based on the product or product category identified by the user.

27. The method according to claim 1, wherein assigning a value to each product comprises:
assigning a rank to each product of the respective list of products for the particular route, according to a likelihood of purchase of each product by the user based on the product or product category identified by the user; and
assigning a weight value to a certain number of the products in order of their assigned rank such that the sum of the assigned weights is a certain value.

28. The system according to claim 9, wherein the value assigned to each product is representative of a degree of relevancy of the product to the user based on the personal information of the user.

29. The system according to claim 9, wherein the value assigned to each product is representative of a likelihood of purchase of the product by the user based on the product or product category identified by the user.

30. The system according to claim 9, wherein assigning a value to each product comprises:
assigning a rank to each product of the respective list of products for the particular route, according to a likelihood of purchase of each product by the user based on the product or product category identified by the user; and
assigning a weight value to a certain number of the products in order of their assigned rank such that the sum of the assigned weights is a certain value.

31. The non-transitory computer-readable medium according to claim 17, wherein the value assigned to each product is representative of a degree of relevancy of the product to the user based on the personal information of the user.

32. The non-transitory computer-readable medium according to claim 17, wherein the value assigned to each product is representative of a likelihood of purchase of the product by the user based on the product or product category identified by the user.

33. The non-transitory computer-readable medium according to claim 17, wherein assigning a value to each product comprises:
assigning a rank to each product of the respective list of products for the particular route, according to a likelihood of purchase of each product by the user based on the product or product category identified by the user; and
assigning a weight value to a certain number of the products in order of their assigned rank such that the sum of the assigned weights is a certain value.

* * * * *